(12) United States Patent
Madden et al.

(10) Patent No.: US 10,726,723 B1
(45) Date of Patent: Jul. 28, 2020

(54) PARKING LOT USE MONITORING FOR SMALL BUSINESSES

(71) Applicant: ObjectVideo Labs, LLC, Tysons, VA (US)

(72) Inventors: Donald Madden, State College, PA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 167 days.

(21) Appl. No.: 16/110,676

(22) Filed: Aug. 23, 2018

Related U.S. Application Data

(60) Provisional application No. 62/550,367, filed on Aug. 25, 2017.

(51) Int. Cl.
G08G 1/14 (2006.01)
G06K 9/00 (2006.01)

(52) U.S. Cl.
CPC ......... G08G 1/146 (2013.01); G06K 9/00771 (2013.01); G06K 2209/23 (2013.01)

(58) Field of Classification Search
CPC combination set(s) only.
See application file for complete search history.

(56) References Cited

U.S. PATENT DOCUMENTS

| | | | | |
|---|---|---|---|---|
| 8,698,896 B2 * | 4/2014 | Nerayoff | ................... | G06T 7/73 348/148 |
| 9,666,075 B2 * | 5/2017 | Davies | ................. | G08G 1/0175 |
| 9,761,139 B2 * | 9/2017 | Acker, Jr. | ............... | G08G 1/144 |
| 10,026,315 B2 * | 7/2018 | High | .................. | G06K 9/00637 |
| 10,354,144 B2 * | 7/2019 | Bataller | .................... | G06T 7/80 |
| 10,482,766 B2 * | 11/2019 | Mowatt | ............. | G06Q 30/0284 |
| 2003/0075287 A1 * | 4/2003 | Weik, III | ................ | B60R 25/00 160/133 |
| 2003/0076417 A1 | 4/2003 | Thomas et al. | | |
| 2013/0166333 A1 * | 6/2013 | Chang | ..................... | G08G 1/142 705/5 |
| 2014/0036077 A1 * | 2/2014 | Nerayoff | ............ | G06K 9/00785 348/148 |
| 2014/0214500 A1 | 7/2014 | Hudson et al. | | |
| 2015/0130638 A1 * | 5/2015 | Bahgat | ................... | G08G 1/146 340/932.2 |
| 2017/0046891 A1 * | 2/2017 | Trivelpiece | ............ | H04N 7/185 |
| 2017/0148324 A1 * | 5/2017 | High | .................. | G06K 9/00771 |
| 2017/0357855 A1 * | 12/2017 | Kusumoto | ......... | G06K 9/00362 |
| 2018/0218605 A1 * | 8/2018 | Mowatt | .................. | G08G 1/144 |
| 2019/0019407 A1 * | 1/2019 | Nakhjavani | ........ | G06K 9/00771 |
| 2019/0156678 A1 * | 5/2019 | Cole | ........................ | G08G 1/04 |
| 2019/0340841 A1 * | 11/2019 | Coyne | .................. | G06Q 20/322 |

\* cited by examiner

*Primary Examiner* — Anand P Bhatnagar
(74) *Attorney, Agent, or Firm* — Fish & Richardson P.C.

(57) ABSTRACT

Methods and systems including computer programs encoded on a computer storage medium, for obtaining imaging data of a parking lot that includes a set of parking spots, detecting a vehicle enter the parking lot, generating a vehicle recognition model for the vehicle, determining that the vehicle is parked in a parking spot, detecting a customer exit the vehicle, generating a customer recognition model for the customer, determining that the customer has entered a business of one or more businesses affiliated with the parking lot, and providing information related to parking space usage for the parking spot and the business to a user device.

20 Claims, 5 Drawing Sheets

PARKING LOT USE MONITORING FOR SMALL BUSINESSES

CROSS REFERENCE TO RELATED APPLICATIONS

This application claims benefit of U.S. Provisional Application No. 62/550,367, filed on Aug. 25, 2017, titled "Parking Lot Use Monitoring for Small Businesses," which is incorporated by reference in its entirety.

TECHNICAL FIELD

This disclosure application relates generally to monitoring systems, and more particularly, to parking lot usage monitoring.

BACKGROUND

Many businesses have parking lots shared with other businesses, which may include designated parking spots for each business that are maintained by the business. Business owners may desire to understand customer usage of the designated parking spots for their respective business.

SUMMARY

Techniques are described for parking lot use monitoring using a distributed camera system. For example, techniques are described for processes for using imaging data from a parking lot monitoring system to track vehicle activity within the parking lot, including parking spot usage, and furthermore to track customers from their respective vehicles at parking spots in the parking lot into one or more businesses affiliated with the parking lot. In some implementations, one or more reports can be generated using the vehicle and customer-monitoring data, and the one or more reports can be provided to a business owner of a business frequented by the one or more customers. The one or more reports can be used by the business owner to track parking lot usage by customers versus non-customers of the business.

In general, one innovative aspect of the subject matter described in this specification can be embodied in methods that include the actions of obtaining imaging data of a parking lot that includes a set of parking spots, the parking lot affiliated with one or more businesses, detecting, from the imaging data, a vehicle enter the parking lot, generating, for the vehicle, a vehicle recognition model, determining, using the vehicle recognition model, that the vehicle is parked in a particular parking spot of the set of parking spots in the parking lot, detecting a customer exist the vehicle, generating, for the customer, a customer recognition model, determining, using the customer recognition model and from the imaging data, that the customer has entered a particular business of the one or more businesses affiliated with the parking lot, and providing, to a user device, information related to parking space usage for the particular parking spot and the particular business.

Other embodiments of this aspect include corresponding systems, apparatus, and computer programs, configured to perform the actions of the methods, encoded on computer storage devices.

These and other embodiments can each optionally include one or more of the following features. In some implementations, the methods further include determining one or more designated businesses for the particular parking spot where the vehicle is parked, determining that the one or more designated businesses for the particular spot do not match the particular business that the customer has entered, generating an alert including information related to the particular parking spot, and providing the alert to a respective owner of each of the one or more designated businesses.

In some implementations, providing information related to parking space usage includes providing, to the user device, one or more parking usage reports in an application environment.

In some implementations, the methods further include generating a map for the parking lot from the imaging data and designating, for a user on the user device, parking spots in the parking lot. Designating parking spots can include designating parking spot permissions.

In some implementations, determining, using the vehicle recognition model, that the vehicle is parked in a particular parking spot of the set of parking spots in the parking lot includes tracking, using imaging data collected from one or more cameras and the vehicle recognition model, a path taken by the vehicle through the parking lot to the particular parking spot.

In some implementations, determining, using the customer recognition model and from the imaging data, that the customer has entered a particular business of the one or more businesses affiliated with the parking lot includes tracking, using imaging data collected from the one or more cameras and the customer recognition model, a path taken by the customer from the vehicle to the particular business.

In some implementations, the one or more cameras each has a field of view including a relevant area of the parking lot and each camera has an overlapping field of view with at least a field of view of one other camera.

Implementations of the described techniques may include hardware, a method or process implemented at least partially in hardware, or a non-transitory computer-readable storage medium encoded with executable instructions that, when executed by a processor, perform operations.

Particular embodiments of the subject matter described in this specification can be implemented so as to realize one or more of the following advantages. Combining one or more recognition models (e.g., a vehicle recognition model and a customer recognition model) with inferred knowledge of a parking lot and known positions of multiple cameras of a distributed camera system makes it possible to track a vehicle and/or a customer through the parking lot where the distributed camera system can have gaps in coverage (e.g., relevant areas of the parking lot are not within a field of view of at least one camera). Using a deep neural network to train a recognition model for a vehicle and/or a customer to detect and classify tracked objects and/or develop categories of features can improve the efficiency of detecting/classifying a vehicle and/or customer in a parking lot and reducing overhead of human experts labeling image data. Generating and storing vehicle and/or customer recognition models can improve the efficiency of reporting and penalizing "repeat offenders" who may violate parking rules in the parking lot, and which may result in a reduced number of reports to process (e.g., by security personnel). Tracking designated parking spot usage throughout times of day, days of the years, etc., as well as monitoring a number of parking spots being used at different times by different types of businesses can allow for an accurate assessment of a number of parking spots needed for a particular set of businesses, thereby optimizing parking spot allocation versus real estate for additional businesses, parks, or the like. The system can include a real-time guidance component, where digital signage or communication with in-car navigation can be used to route customers to open parking spots, or to direct customers to most convenient parking spots relative to their intended destination.

By tracking vehicles/customers within the parking lot, the system can provide advanced notice to business (e.g., a business owner or employee) if a customer is determined to be parked in a designated parking spot for the business, for example, to allow an employee of the business to move to the front of the business (e.g., to tend to a front counter). In one example, using vehicle and/or customer models to track repeat visitors to a business can assist in alerting a business owner of a regular customer visiting their business (e.g., to prepare the customer's order, collect the customer's dry-cleaning from storage, etc.).

The system can provide information to a business owner about the habits of employees by tracking vehicles/people within a parking lot, for example, times that employees arrive/leave work, observing security protocols, tracking merchandise/cash assets entering/exiting the business area, increasing business efficiency, security, and the like. Additionally, the system can provide real-time security monitoring feedback, e.g., for an AMBER alert, where the system can search known vehicles/customers in a parking lot for any vehicles matching a security alert, and then attempt to match that to the person(s) associated with that vehicle to look for a match, and notify security to confirm any potential matches.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
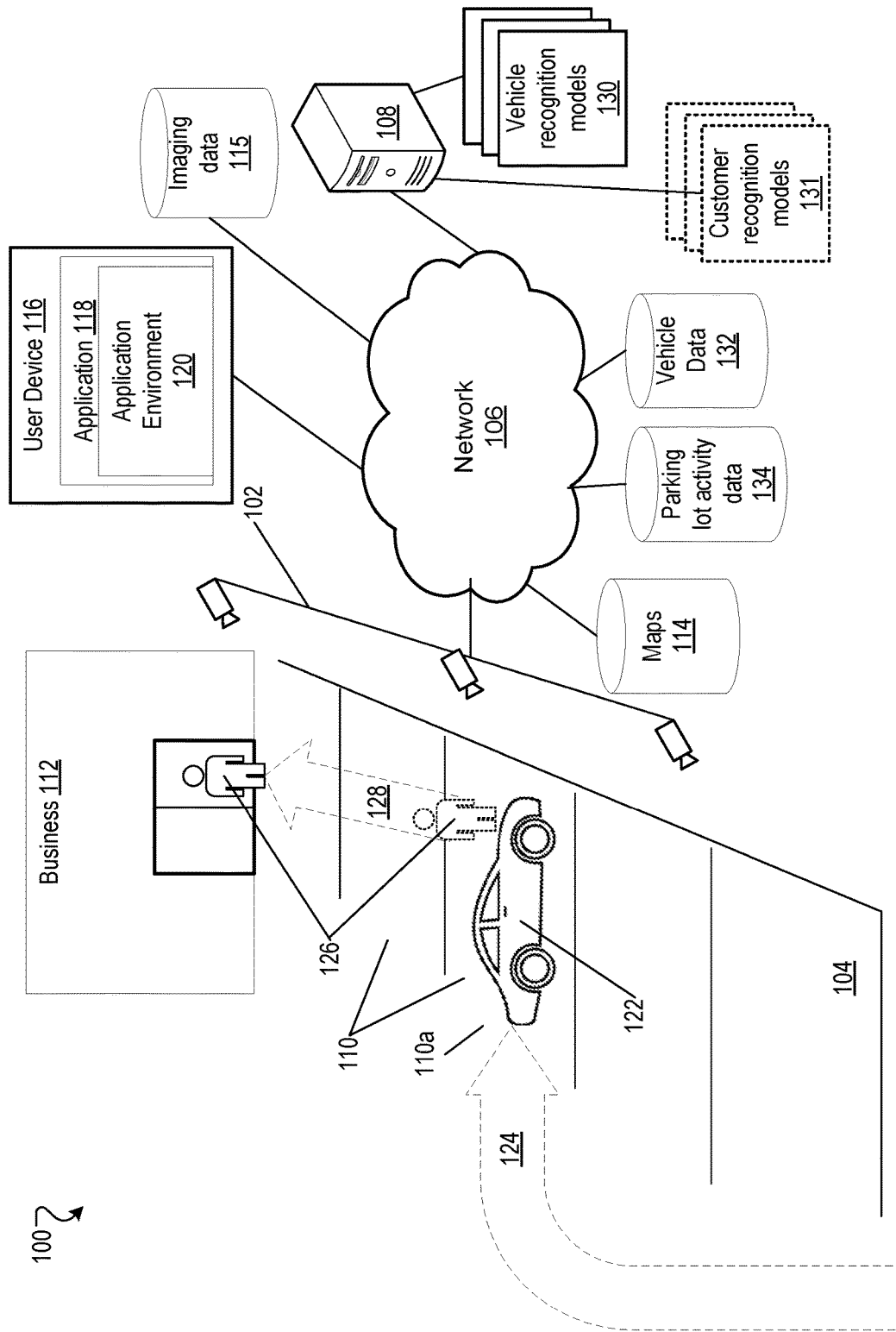
FIG. 1 illustrates an example operating environment for a parking lot use monitoring system.

Techniques are described for parking lot use monitoring using a distributed camera system. A distributed camera system can include multiple cameras and/or other monitoring devices (e.g., sensors) that collect, for example, visual imaging data of a parking lot. A map may be generated of available parking spots using the collected visual data, maps and/or other geolocation information. The map can be presented in an application window of a parking lot usage application (e.g., a graphical user interface) to a user (e.g., a business owner) along with tools for monitoring and customizing the map and parking lot information. For example, the one or more available parking spots included in the generated map can be assigned parking spot permissions using the application. Parking spot permissions can be assigned, for example, by a business owner of a business affiliated with the parking lot using the parking lot usage application.

A vehicle is determined to enter into the parking lot, and the distributed camera system captures the vehicle image data as the vehicle progresses through the parking lot. One or more recognition models (e.g., a vehicle recognition model, a customer recognition model) are created and vehicle activity is tracked in the parking lot (e.g., which parking spot the vehicle uses) using the vehicle recognition model. One or more customers can be determined to exit the vehicle and data related to the customers (e.g., facial recognition data) can be added to the one or more recognition models (e.g., added to the vehicle recognition model, or added to the customer recognition model). The one or more recognition models can be linked to one or more other recognition models. For example, a vehicle recognition model tracking vehicle activity for a particular vehicle can be linked to a customer recognition model tracking customer activity for a particular customer, where the particular customer is associated with the particular vehicle (e.g., the customer is determined to exit from the vehicle). The customers are tracked from the vehicle to a business using the distributed camera system, the one or more recognition models (e.g., the customer recognition model), and the generated map, where the one or more customers are determined to enter the business. In some implementations, the one or more customers can be tracked exiting the business and re-entering the vehicle, and the vehicle can be tracked exiting the parking lot.

In some implementations, the parking lot monitoring system can be used to provide automatic parking validation by associating vehicles in the parking lot with customers exiting their respective vehicles and entering one or more businesses affiliated with the parking lot.

In some implementations, one or more reports can be generated. The one or more reports can include information related to parking lot usage, for example, designated parking spot usage, customers parking in the parking lot and frequently one or more businesses affiliated with the lot, temporal data related to vehicle and/or customer presence in the parking lot, and other similar activities. The one or more reports can be provided to a business owner of a business affiliated with the parking lot. In some implementations, the business owner can alter or adjust permissions according to collected data presented in the one or more reports.

FIG. 1 illustrates an example operating environment for a parking lot use monitoring system 100. A distributed camera system 102 can include multiple cameras such that the combined fields of view of the cameras in the distributed camera system 102 collect imaging data from the relevant areas (e.g., the entire area) of the parking lot 104. In some implementations, the distributed camera system 102 includes continuous (or nearly continuous) coverage of camera views (e.g., the camera views are aligned such that each camera view overlaps with at least one other camera view). The multiple cameras of the distributed camera system 102 can include surveillance cameras (e.g., motion sensor-activated cameras, infrared cameras, night-vision cameras, or the like). In some implementations, the multiple cameras of the distributed camera system 102 can use stereo and/or other depth-sensing technology (e.g., time of flight, LIDAR), to increase robustness of detection and tracking.

Network 106, such as local area network (LAN), the Internet, or a combination thereof, connects a server computer 108 and the distributed camera system 102. The server computer 108 is represented in FIG. 1 as a single entity, but can include multiple different servers in communication directly or over the network 106.

Parking lot 104 can include one or more parking spaces 110 designated in the parking lot 104. A business 112 is affiliated with the parking lot 104 (e.g., they own or co-own the parking lot, pay for usage of the parking lot, etc.). In some implementations, particular parking spaces 110 of parking lot 104 can be assigned to and/or designated for use by a business owner of the business 112 such that they are for the use of customers frequenting the business 112.

Imaging data 115 collected by the distributed camera system 102 can be used to generate one or more parking maps 114. The one or more parking maps 114 can be generated during a calibration (e.g., geospatial calibration of the cameras) or set-up process of the parking lot monitoring use system 100. In one example, a calibration or set-up process is executed when the parking lot 104 is empty of traffic (e.g., no vehicles and/or customers). In another example, the calibration or set-up process is executed over a period of time where the appearance of the parking lot 104 can be acquired as obstructions (e.g., vehicles) move around such that temporarily obstructed views are filled in over the period of time.

In some implementations, a background appearance model (e.g., a baseline) for each camera of the distributed camera system 102 and/or for each area of interest (e.g., parking spots) can be generated. The background appearance model can incorporate factors that affect a baseline measurements for each camera or area of interest, for example, weather, lighting conditions, or other conditions that may affect imaging data collected.

In some implementations, the respective fields of view from each camera of the distributed camera system 102 (e.g., top-down or angled views) can each be registered to a 2-dimensional (2D) overhead parking map. In some implementations, a planar homography between the respective views of each camera in the distributed camera system 102 can be computed based on reference points in the camera image and a reference map (e.g., an overhead image, blue prints/plans for the parking lot, or the like). Features (e.g., parking space lines) can be detected in the respective camera views and correlated with the same features in the reference map. In some implementations, each camera in the distributed camera system may be registered to the reference map, such that a transformation from a camera in the distributed camera system 102 to each other camera in the distributed camera system 102 can be computed.

In some implementations, the parking map 114 may include identified paths that can be taken by vehicles and/or pedestrians (e.g., customers) through the parking lot 104. For example, the parking map 114 can include crosswalks, sidewalks, or other paths generally followed by customers from their respective vehicles to a business.

In some implementations, the parking map 114 can be generated using reference map information including geo-location information, for example, Bluetooth, Wi-Fi signal strength, and/or GPS locations of the cameras of the distributed camera system 102. For example, relative locations determined by GPS of each camera can be used to determine relative locations of each camera to each other camera in the distributed camera system 102 and the location of each camera and respective field of view of each camera in the parking map 114.

In some implementations, a parking map 114 can be generated using a respective camera field of view from each camera of the distributed camera system 102. Features (e.g., parking space lines) from overlapping camera fields of view can be matched in order to register the cameras together (e.g., identify a same feature appearing in multiple camera views).

In some implementations, moving objects (e.g., vehicles, customers) can be tracked by each camera of the distributed camera system 102 as they move through a scene composed of multiple camera fields of view. The tracking information may be used to determine the relationships between each camera (e.g., where the camera views overlap, relative camera parameters, where the camera fields of view do not overlap, relative orientations of respective cameras). Once relative mappings between the cameras of the distributed camera system 102 are determined, each camera's field of view can be rectified to a 2D overhead image, and features (e.g., parking space lines) can be automatically extracted to create the parking map 114.

In some implementations, parking map 114 can be generated for a multi-level parking garage or another similar arrangement, where the parking map 114 includes multiple layers (e.g., representing multiple floors of a parking deck), where each layer of the parking map 114 is generated following a same process as described above.

The parking map 114 can be accessed by a user device 116. A user device 116 is an electronic device capable of requesting and receiving data information over the network 106. Example user devices 116 include personal computers, mobile communication devices, and other devices that can send and receive data over the network 106. A user device typically includes an application 118, such as a web browser, to facilitate the sending and receiving of data over the network 106. The web browser can enable a user to display and interact with text, images, videos, music, and other information typically located on a web page at a website on the world wide web or a local area network. In some implementations, application 118 is a parking lot usage application accessible by a user device 116 and can display the parking map 114 in an application environment 120. The application environment 120, for example, a graphical user interface (GUI) of the parking lot usage application 118 can display the parking map 114, along with tools for interacting with the parking map 114.

A user on user device 116 can access parking map 114 and interact with the parking map 114 through the application environment 120. Interactions between the user and the parking map can include, for example, designating parking spots 110 corresponding to business 112, setting activity monitoring and data collection (e.g., by the distribute camera system 102), and automatic parking validation for designated parking spots 110. Different parking spots 110 can have different characteristics and properties assigned to them, for example, size, ID number, ownership (e.g., a particular business 112 is affiliated with the parking spot 110), rate (e.g., cost to park per unit time), vehicle type (e.g., compact or RV), handicapped or other restricted type, and the like. Further details of the application environment 120 are discussed herein with reference to FIG. 3.

In some implementations, valid parking spots 110 are defined on the map 114 through automatic recognition by the parking lot use monitoring system 100 using video analytics (e.g., based on appearance, geometry, or machine learning). Valid parking spots 110 can be automatically defined by extracting parking information from a reference map (e.g., blueprints), and/or inferred through observation of vehicles parking in the parking lot 104 over time.

Once the map 114 has been generated, the distributed camera system 102 can collect imaging data 115 of various tracked objects within the parking lot 104. Different tracked objects can be categorized based in part on type, where a type of tracked object can depend on a type of interaction that the tracked object has with the parking lot 104. For example, types of tracked objects can include pedestrian, vehicle, shopping cart, etc. In some implementations, further distinctions between classifications of tracked objects. For example, the parking lot use monitoring system 100 may distinguish between bus vehicles and passenger vehicles, or shopping carts from a first business and shopping carts from a second business.

In some implementations, the distributed camera system 102 collects imaging data 115 of a vehicle 122 and a customer 126 affiliated with the vehicle 122 through all parking lot activity in the parking lot 104, such that the vehicle 122 is monitored through path 124 (e.g., from an entrance of the parking lot to the parking spot 110) and the customer 126 is monitored through path 128 (e.g., from the vehicle 122 to business 112) in a continuous (or nearly continuous) manner. In one example, vehicle 122 and the customer 126 are captured by successive cameras in the distributed camera system 102 such that the vehicle 122 and customer 126 are continuously in range of at least one camera of the distributed camera system 102 for an entirety of time spent in parking lot 104.

In some implementations, the distributed camera system 102 includes cameras that have fields of view of the parking lot 104. The distributed camera system 102 can also include cameras that are located inside business 112 that is affiliated with the parking lot 104, such that activity inside the business 112 can be tracked for a customer 126 who has entered the business 112 from parking lot 104.

The imaging data 115 collected by the distributed camera system 102 can be used by the server 108 to generate one or more recognition models (e.g., a vehicle recognition model 130). A vehicle recognition model 130 generates a digital representation of the vehicle 122, such that it can be differentiated from the map 114 of the parking lot 104 by the parking lot use monitoring system 100. The vehicle recognition model 130 can be generated based in part on vehicle appearance, geometry, and movement. In one example, a vehicle recognition model 130 can build a three-dimensional model (e.g., a digital representation) of the vehicle 122 as they enter the parking lot 104 to assist tracking the vehicle 122 through the parking lot 104. In some implementations, vehicle data 132 can be used by server 108 to refine the vehicle recognition model 130, for example, classifiers related to vehicle make, model, year, color, and other relevant physical feature aspects.

The vehicle recognition model 130 can additionally incorporate information about one or more customers 126 associated (e.g., a driver or passenger of the vehicle) with the vehicle 122. In some implementations, facial recognition or other identification software can be used to identify customer 126 and track the movements of the customer along path 128 through parking lot 104.

In some implementations, a customer recognition model 131 generates a digital representation of the customer 126, such that the customer 126 can be differentiated from the map 114 of the parking lot 104 by the parking lot monitoring system 100. The customer recognition model 131 can be generated based in part using facial recognition software, appearance, and movement of the customer. In one example, the customer recognition model 131 can build a two-dimensional or three-dimensional model (e.g., a digital representation) of the customer 126 as they are detected in the parking lot 104 (e.g., exiting vehicle 122, or entering parking lot 104 on foot as a pedestrian) to assist in tracking the customer 126 through the parking lot 104. In some implementations, the customer recognition model 131 for a particular customer 126 can be linked to the vehicle recognition model 130 for a particular vehicle 122 such that the parking lot monitoring system 100. For example, a customer 126 is detected exiting a vehicle 122, such that the customer recognition model 131 for the customer 126 is linked to the vehicle recognition model 130 for vehicle 122.

In some implementations, deep neural networks can be used to train the one or more recognition models to detect and classify tracked objects (e.g., vehicles, customers, shopping carts), and/or to develop categories of features which can be used to detect and classify tracked objects (e.g., color of a vehicle, make/model of a vehicle, facial features of a customer, etc.).

In some implementations, vehicle 122 and/or customer 126 are discontinuously in range of the multiple cameras of the distributed camera system 102 such that there are gaps in coverage during the time that the vehicle 122 and/or the customer 126 are in parking lot 104. The one or more recognition models are combined with inferred knowledge of the parking lot (e.g., the parking lot map 114) and known positions of the cameras in the distributed camera system 102, such that an inference of vehicle 122 and/or customer 126 position can be made during gaps in coverage.

Additionally, behavioral data (e.g., at least one customer tends to get out of a driver's side of a vehicle) can be used to infer vehicle activity and/or customer activity in the parking lot 104. For example, a vehicle can enter a gap of coverage of a camera view between a first camera and a second, adjacent camera in the distributed camera system 102. The vehicle can then be detected by a second camera in the distributed camera system 102 a time period later. Shortly thereafter, a customer that has not previously been detected is identified by the second camera. If no other entrances or exits are detected from the gap between the first camera and the second camera during a particular time period (e.g., time period where the vehicle was in the gap) the system may determine that the customer exited the vehicle while the vehicle was in the gap of coverage.

In some implementations, parking lot activity data 134 for parking lot 104 can be stored for a determined amount of time on server 108. For example, imaging data related to vehicle 122 (e.g., paths 124 and 128, parking spot 110a, customer 126) can be saved until the vehicle 122 is determined to have exited the parking lot 104. In another example, imaging data related to vehicle 122 can be saved for an extended period of time such that vehicle 122 and customer 126 can be tracked across repeated visits to parking lot 104 (e.g., to provide customer activity information to a business or determine repeat offenders improperly using the parking lot). Additionally, data related customer 126 visits to business 112 can be saved.

Figure 2:
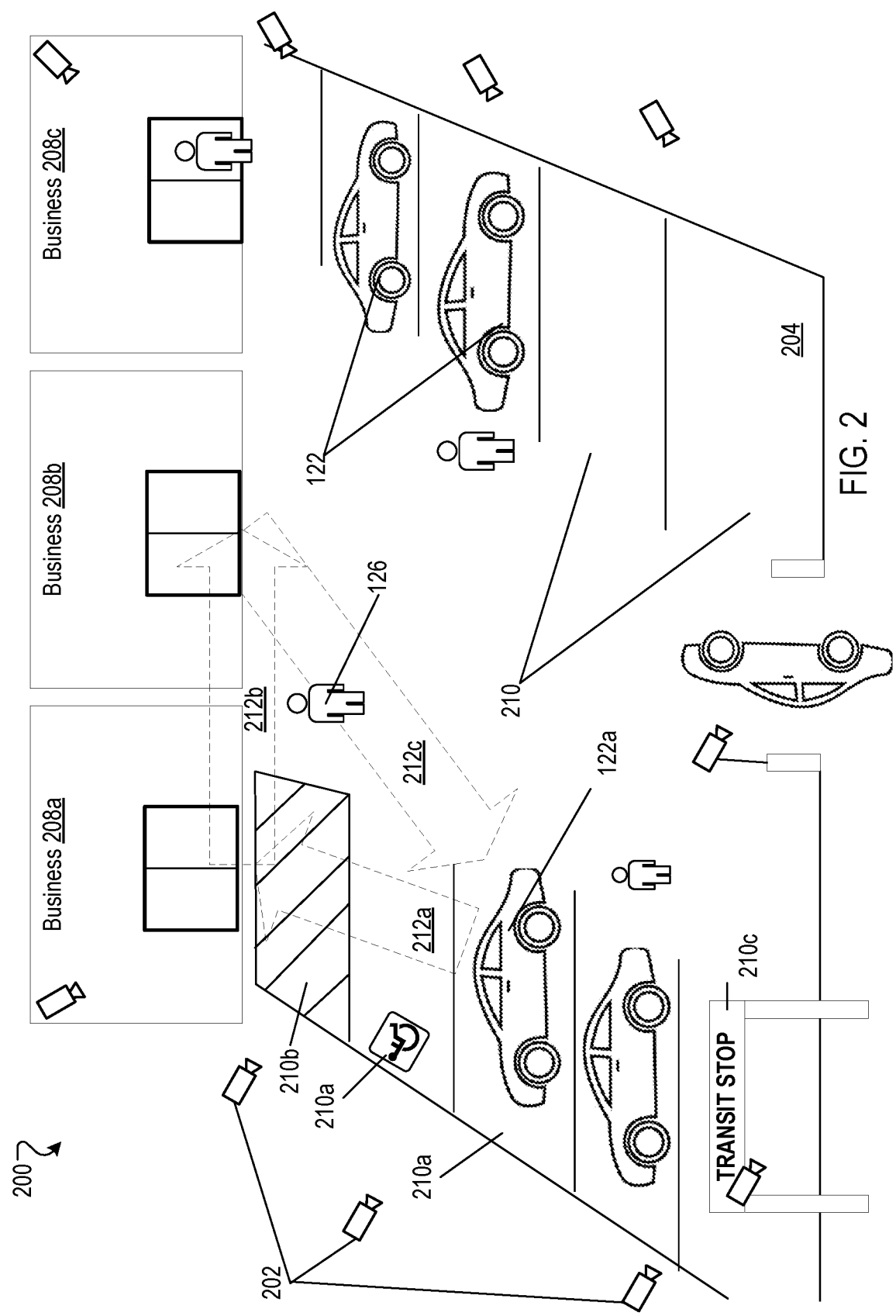
FIG. 2 illustrates an example system for implementing parking lot use monitoring in a parking lot attached to several businesses.

In some implementations, a parking lot 104 is a shared parking lot between two or more businesses 112. FIG. 2 illustrates an example parking lot monitoring system 100 for implementing parking lot use monitoring in a parking lot attached to several businesses. Distributed camera system 202 includes multiple cameras to obtain imaging data of parking lot 204 including parking spots 210 and businesses 208.

In some implementations, one or more parking spots 210 are assigned permissions that designate the parking spots 210 as restricted or parking spots and/or zones where only specific vehicles and/or personnel can park. For example, a restricted parking spot can include a handicap parking spot 210a, a cart-return (e.g., for a grocery store), an expectant mothers parking spot, employees only parking spot, or the like. In another example, a loading zone 210b, a fire zone, a transit stop (e.g., bus stop 210c) can be designated to prevent customers from utilizing the areas as parking spots.

In some implementations, the bus stop 210c can be monitored by the parking lot use monitoring system 100, for example, to track customers 126 as they exit a bus (not shown) and enter a business 208. Additionally, the parking lot use monitoring system 100 can monitor the bus stop 210c to determine if customers 126 are parking vehicles 122 in the parking lot 204 and taking public transit rather than visiting the designated businesses 208.

In some implementations, the parking lot use monitoring system 100 can be used to track customer 126 during a visit in which the customer 126 visits multiple businesses 208. For example, customer 126a can be tracked exiting vehicle 122a through path 212a to business 208a, followed by path 212b to visit business 208b, and finally through path 212c back to vehicle 122a. A duration of each visit to the respective businesses can be recorded, such that a cost-sharing of the parking spot 110a is divided between business 208a and 208b based in part on the duration of the respective visits to the businesses by the customer 126.

In some implementations, additional monitoring systems can be implemented to facilitate tracking vehicle 122 in parking lot 104. For example, a license plate reader can be used (e.g., at the entrance of parking lot 104) to record entry of a particular vehicle into the parking lot 104. A license plate reader can additionally facilitate tracking repeated visits to the parking lot 104 by a particular vehicle 122. In another example, other sensors, such as inductive loop vehicle presence sensors, light curtain sensors, keycard readers, or the like, can be integrated with the parking lot use monitoring system to provide additional cues as to the presence and/or identity of vehicle 122 within the parking lot 104, and can be integrated into the vehicle recognition model 130.

One or more reports can be generated using data collected by the parking lot use monitoring system and displayed in an application environment of a parking lot usage application.

Figure 3:
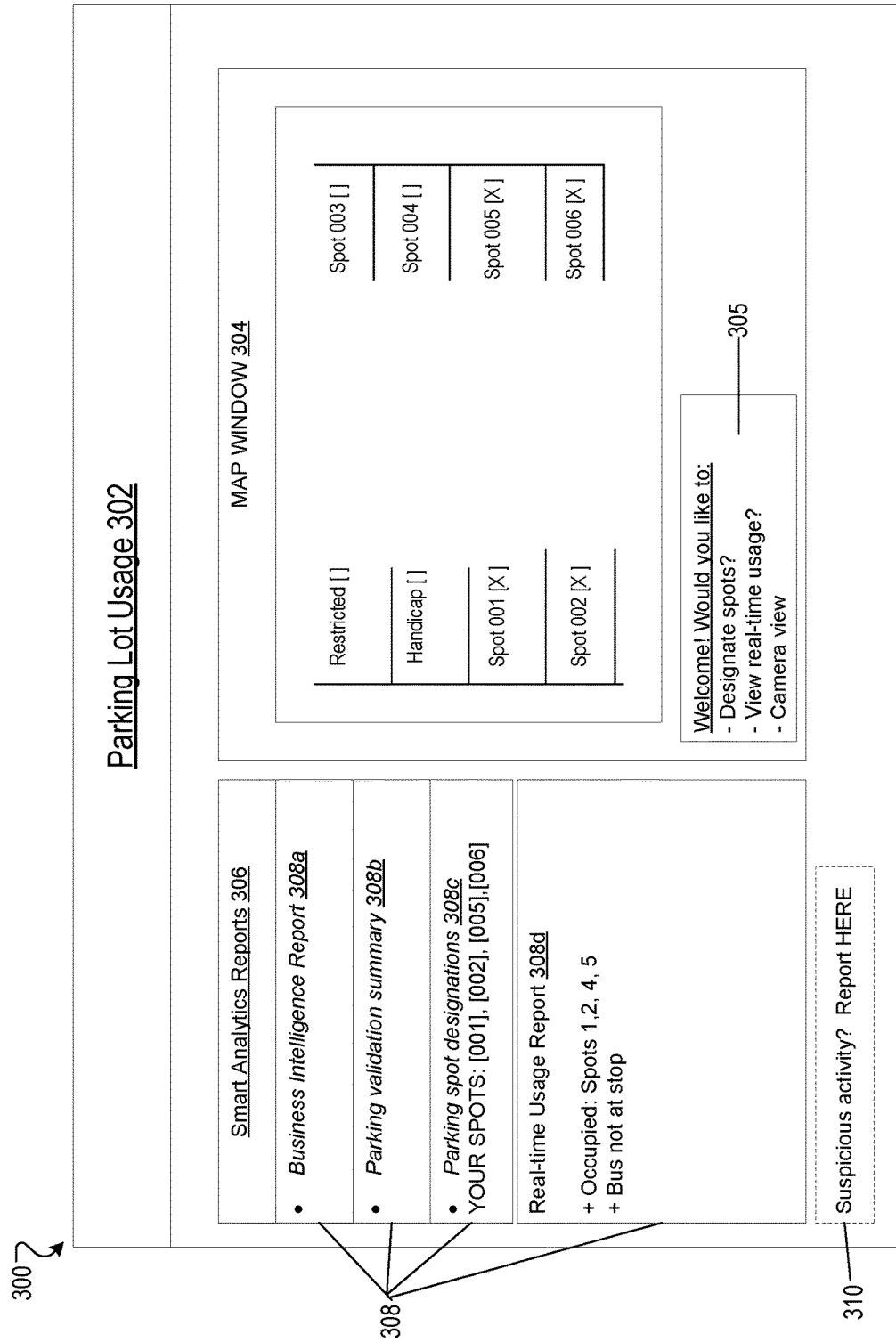
FIG. 3 illustrates an example application with a parking lot use monitoring application environment.

FIG. 3 illustrates an example application 300 with a parking lot usage application environment 302. Parking lot usage application environment 302 can be, for example, a graphical user interface (GUI) that allows a user on a user device (e.g., user device 116) to interact with one or more aspects of the parking lot use monitoring system 100.

In some implementations, the application environment 302 includes a map window 304 presenting a map (e.g., map 114) of a parking lot. The map window 304 can include features that allow the user to view and interact with the map through interactive options 305, for example, to designate one or more parking spots (e.g., parking spots 110) as affiliated with a business (e.g., business 112), view real-time parking spot usage, or a live camera view of the parking lot. The map window 304 can include designations for specialty spots such as restricted (e.g., loading zone, emergency zone, bus stop, handicap parking).

In some implementations, map window 304 can display real-time parking lot activity including vehicle and/or customer movement through the parking lot. Real-time parking lot activity can also include parking spot occupancy and information related to the customers whose vehicles are in particular parking spots (e.g., which business the customer has entered).

In some implementations, map window 304 can display historical parking lot activity and/or recorded video of the parking lot activity including vehicle and/or customer movement through the parking lot.

In some implementations, the application environment 302 includes smart analytics reports window 306. Smart analytics reports window 306 can include one or more reports 308 accessible by the user on the user device, for example, a business intelligence report 308a, a parking validation 308b, a parking spot designation summary 308c, and a real-time usage report 308d.

In some implementations, a business intelligence report 308a can include information related to parking space usage in the parking lot (e.g., over usage, under-usage). For example, an analysis of pedestrian traffic (e.g., by tracking customers entering the parking lot on foot and walking to business 112) could result in the determination that parking spaces are being over-utilized. In another example, tracking the paths (e.g., through the parking and/or on sidewalks) taken by customers from their parked vehicles to a business can yield information related to utilization of the parking spots near the business (e.g., how far they have to walk from their vehicle to the business), accessibility of foot paths (e.g., sufficient sidewalk coverage), or if customers tend to cut through specific regions of the parking lot 104.

In another example, in a shared parking lot between several businesses, a business intelligence report can include a measure of a number parking spots used by a particular business versus a number of parking spots used by other businesses sharing the parking lot. Determining a measure of parking spots used by a particular business may include tracking customers parked in parking spots as they enter the particular business and recording on the server 108 each visit to the particular business versus customers parked in parking spots and entering a different business. Information related to parking space usage can help business owners decide, for example, how to divide costs and maintenance, parking spot allocation, efficiency of parking spot allocation, cost effectiveness of the parking spots, and other parking-related business decisions.

In some implementations, the business intelligence report can include information about relative durations of visits to multiple businesses by a customer, where a longer duration visit to a first business by the customer can result in a larger share in a cost-sharing scheme of the parking lot than a shorter duration visit to a second business by the customer. Tracking duration of visits may include tracking a customer as they enter each business and exit the particular visit using, for example, facial recognition or other image recognition software, and recording by the server a temporal difference between entrance and exit.

In some implementations, the business intelligence report can also include metrics comparing occupancy of a parking spot against business generated during the occupancy of the parking spot. For example, the server 108 can record a time stamp of vehicle occupancy of parking spots designated for a particular business and compare it to time stamps for purchases made at the particular business during an overlapping time.

In some implementations, the business intelligence report can include information related to parking lot usage over certain periods of time (e.g., weekends vs. weekdays), special events (e.g., sales-related, holiday-related events), or nearby events that may impact parking in the parking lot 104 (e.g., a parade, concert, race). For example, occupancy and usage of parking spots for a restaurant may be higher during evenings and/or weekends, whereas occupancy and usage of parking spots in the parking lot 104 may be higher during weekday business hours for a bank.

In some implementations, the business intelligence report can include information related to details about the vehicles and/or customers utilizing the different designated parking sports, e.g., particular makes and models of vehicles, for potential marketing purposes. For example, types of vehicles and customers visiting different businesses can inform lifestyle choices and targeted marketing by the businesses.

In some implementations, a parking validation summary 308b can include information related to vehicles entering the parking lot and utilizing a designated spot for a business, where the business is billed for the use of the spot when a customer affiliated with the vehicle has been detected by the parking lot use monitoring system to have entered the business. For example, a gated parking lot (e.g., a parking-ticket free lot) can track a vehicle upon entry to the parking lot (e.g., the server 108 detects the vehicle 122 entering parking lot 104 using imaging data from the distributed camera system 102), determine which designated spot in which the vehicle parks (e.g., the parking spots as designated by a business owner on the parking lot usage application 300), determine that a customer affiliated with the vehicle has entered the business (e.g., the server 108 tracks a customer 126 to the door of business 112 using imaging data from the distributed camera system 102), and automatically bill/expense the business whose designated spot has been utilized by the vehicle upon the vehicle exiting the parking lot.

In some implementations, a parking spot designation summary 308c can include information related to parking spots in the parking lot and characteristics of particular parking spots. For example, a parking spot designation can include identifying which of the available parking spots in the parking lot are allocated for each business which utilizes the parking lot. In another example, a parking spot designation can identify restricted parking spots and/or areas in the parking lot (e.g., handicap parking spot, loading zone, fire lane, bus stop). A user (e.g., a business owner) on a user device 116 can access map 114 through an application environment 302 of a parking lot usage application 304 and designate one or more parking spots 110 using the interactive tools provided by the application environment 302. The server 108 may also automatically designate parking spots using, for example, using imaging data from the distributed camera system 102 and identifying parking lines, signage related to restricted parking, and the like.

In some implementations, a real-time usage report 308d can include information related to real-time usage of parking spots (e.g., designated parking spots for a business). Real-time usage information related to traffic congestion in the parking lot can be, for example, integrated with digital signage within the parking lot to help mitigate congestion and aid parking for customers. For example, the server 108 can identify the presence of a threshold of vehicles (e.g., a set number of vehicle occupancy relative to a size of the parking lot) in the parking lot using imaging data from the distributed camera system and change one or more traffic patterns in response. In another example, the server 108 can notify vehicles entering the parking lot through digital signage that the parking lot is at maximum capacity based on determining that the parking spots are all occupied. Other real-time information, for example, whether a bus or other public transit is currently at a bus stop or whether a loading zone is occupied, can also be provided in a real-time usage report 308d. For example, the server 108 can use imaging data from the distributed camera system 102 to identify a bus or other public transit within a frame of a camera viewing the bus stop. In some implementations, a real-time usage report 308d includes information related to customers using parking spots in the parking lot and not frequenting the business affiliated with the parking lot (e.g., a person using a lot as a park-and-ride). For example, the server 108 can use imaging data from the distributed camera system 102 to track customers 126 exiting vehicles 122 that are parked in parking spots 110 and walking away from business 112 and out of the parking lot 104.

In another example, real-time usage report 308d can include information related to shopping cart inventory (e.g., for a grocery or other retail business) within the parking lot (e.g., in a cart return located in the parking lot). For example, the server 108 can use imaging data from a camera from the distributed camera system 102 having a field of view of an identified cart-return location to track shopping cart occupancy of the cart-return location.

In some implementations, the application environment includes security-related content 310. For example, a user on a user device (e.g., a business owner) can report suspicious activity (e.g., people interacting with multiple vehicles), report violations of parking lot restrictions (e.g., parking in a designated restricted parking spot), or misuse of a designated parking spot (e.g., a vehicle parked in a spot, but the customer did not enter the designated business). In some implementations, an automatic system can be triggered by security settings and permissions designated for the parking lot, for example, if the parking lot use monitoring system detects a vehicle parked incorrectly in a restricted parking spot, a tow truck can be called. For example, the server 108 can use a camera having a field of view of a designated restricted parking spot 110 to identify a vehicle 126 parked in the designated restricted parking spot 110 and generate an alert to the user device 116 through application 118.

Figure 4:
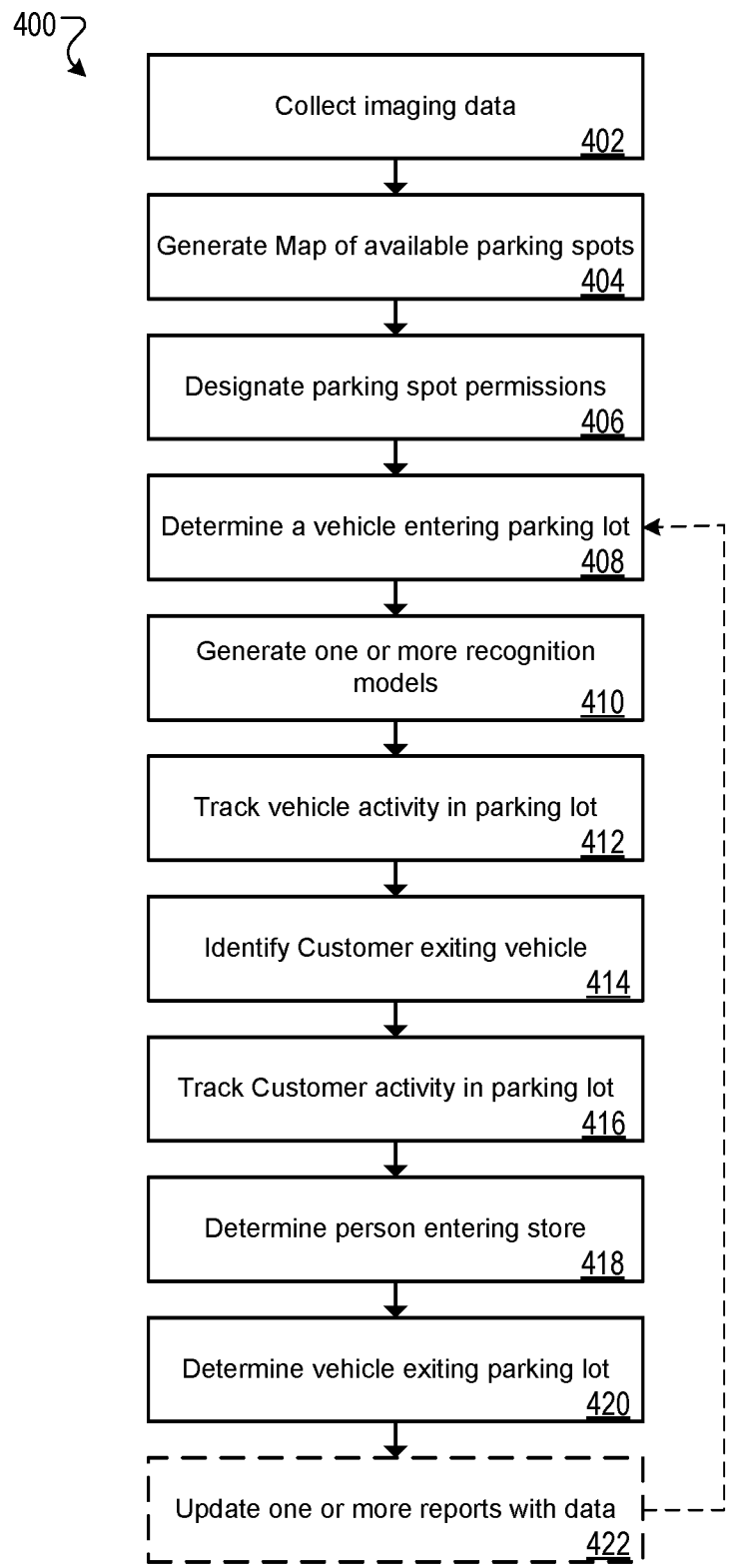
FIG. 4 is a flow diagram of an example process for parking lot use monitoring.

FIG. 4 is a flow diagram of an example process 400 for parking lot use monitoring. Imaging data is collected from the distributed camera system (e.g., distributed camera system 102) (402). For example, the server 108 may receive images captured at a particular time from each of the multiple cameras of the distributed camera system. The distributed camera system 102 can include multiple cameras where each camera has an overlapping field of view with at least one other camera. The multiple cameras of the distributed camera system 102 can be configured such that an entire area of the parking lot 104 is within a field of view of at least one camera.

A map is generated of the parking lot (e.g., parking lot 104) including available parking spots (e.g., parking spots 110) (404). For example, the server 108 may determine how different fields of view of the cameras interrelate through the images from the cameras and identify parking spots in the images through recognizing parking lines, parking meters, parking signs, etc. in the images, and then generate a map based on how the fields of view interrelate and the identified parking spots. In some implementations, a calibration process for the distributed camera system 102 is conducted to take top-down and/or angled views from each camera of the distributed camera system 102 and converting the views into a 2D overhead map (e.g., map 114) of the parking lot 104. In some implementations, other map information including geolocation information, construction blue print, mapping application maps, or the like is incorporated with the map 114.

Parking spot permissions (e.g., an affiliated business for each parking spot, restricted parking spots) are designated (406). For example, a user (e.g., a business owner) on a user device (e.g., user device 116) can view and interact with the map 114 through an application environment of a parking lot use monitoring application 118 (e.g., a web-based application). Within the application environment, the user can assign permissions to one or more of the identified parking spots 110 in the parking lot 114 (e.g., designating a parking spot 110 to a particular business 112, assigning handicap parking spots, etc.).

A vehicle (e.g., vehicle 122) is determined to enter the parking lot 104 (408). For example, the server 108 may determine that the vehicle 122 has entered the parking lot 104 through identifying the vehicle 122 in an image from a camera with a field of view of the entrance of the parking lot 104. The vehicle 122 may proceed to follow a path (e.g., path 124) through the parking lot 104. The distributed camera system 102 may collect images of the vehicle 122 as it travels along path 124 through the parking lot 104.

Using image data collected by the distributed camera system 102 and vehicle data 132, one or more recognition models (e.g., vehicle recognition model 130, customer recognition model 131) may be generated (410). For example, the server 108 may collect imaging data from the distributed camera system 102 and use trained deep neural networks to detect and classify the vehicle in the collected imaging data using known categories (e.g., year, make, model, color). A vehicle recognition model 130 can include a three-dimensional model of the vehicle 122 including, for example, year, make, model, color, and other classifiers.

In some implementations, a vehicle recognition model 130 is generated for each vehicle 122 that is determined to enter the parking lot 104. Multiple detections of the vehicle 122 can be reported by multiple different cameras in the distributed camera system 102 and combined into a single reported vehicle using the vehicle recognition model 130 to determine that the multiple reports correspond to a single vehicle 122.

In one example, a sedan is detected in a first camera of the distributed camera system 102, the system creates a vehicle recognition model 130 describing it. A description of the sedan can be a mathematical representation of extracted features of the sedan (e.g., color, make, model) which can then be matched to learned features of a generic "sedan" vehicle model. In one example, color of the vehicle can be extrapolated based in part on a predominant extracted RGB values. In another example, bumper stickers or other identifying features can be mathematically represented as "extracted features" that can be matched between frames captured by a camera and/or between frames captured by different cameras. The parking lot monitoring system 100 may verify through all stored vehicle recognition models on the server 108 to see if this is a vehicle that has previously been detected in the parking lot 104, for example, in another camera of the distributed camera system 102. For a vehicle recognition model 130 which is determined to be the same as a previously generated vehicle recognition model 130, a tentative link may be place between them, to represent the hypothesis that this is the same car, or the new model may replace the old model. A first camera may detect the vehicle 122 in a particular location of the parking lot 104, and determine a vehicular velocity and trajectory of movement for the vehicle 122. As the vehicle 122 leaves the field of view of the first camera, a vehicle may be detected on a second camera, traveling at a similar or same velocity and trajectory. Based on a geometry of the first camera relative to the second camera (e.g., overlapping fields of view) a vehicle recognition model 130 generated for the vehicle 122 for the first camera may be determined to be the same vehicle represented by a second vehicle recognition model 130 generated for the second camera. The two vehicle recognition models 130 may then be merged together as they are determined to represent the same vehicle 122.

Vehicle activity is tracked through the parking lot 104 (412). For example, the vehicle recognition model 130 is utilized by the parking lot monitoring system 100 to track a particular vehicle 122 through the parking lot 104 (e.g., assists in determining that the particular vehicle is the same through various frames from different cameras of the distributed camera system 102). Vehicle activity can include the vehicle entering a parking spot 110, where a vehicle is identified as parked in a parking spot (414). In some implementations, a vehicle can stop at a passenger unloading zone rather than a parking spot, and one or more customers can exit the vehicle 122 in the passenger unloading zone. In some implementations, when the vehicle is determined to be parked in parking spot 110, an update is sent through the network 106 to a real-time usage report (e.g., real-time usage report 308*d*) displayed in the application environment 120 of the parking lot use monitoring application 118 on the user device 116.

A customer (e.g., customer 126) is identified as exiting the vehicle 122 (416). For example, the server 108 may determine from images from the distributed camera system 102 that a door of the vehicle 122 has opened and that a person has exited the vehicle 122 through the door. A customer can include a driver of the vehicle 122 or a passenger of the vehicle 122. The server 108 may collect imaging data from the distributed camera system 102 and use trained deep neural networks to detect and classify the customer in the collected imaging data using known categories and/or classifiers (e.g., height, facial features, movement) and generate the customer recognition model 131.

Customer activity for customer 126 is tracked in the parking lot 104 (418). For example, the server 108 may track a path of the customer 126, previously identified as having exited the vehicle, through the images of the customer 126 from the distributed camera system 102 using the customer recognition model 131. Customer activity includes tracking a path 128 taken by the customer as they exit the affiliated vehicle 122, businesses 112 that the customer 126 may frequent (e.g., enter and spend a determined amount of time within), and paths that the customer can take from a business back to the affiliated vehicle (e.g., in order to leave the parking lot), or between two or more businesses.

The vehicle 122 is determined to leave the parking lot 104 (420). For example, the server 108 may determine in imaging data collected by a camera from the distributed camera system 102 with a field of view facing an exit of the parking lot 104 and the vehicle recognition model 130 that the vehicle 122 has exited the parking lot 104. In some implementations, as the vehicle 122 exits the parking lot 104, an automated parking validation system can be triggered in which the one or more businesses frequented by the customer 126 in vehicle 122 are billed for parking fees.

In some implementations, one or more reports are updated to include data related to the vehicle activity and/or customer activity in the parking lot 104 (422). As discussed with reference to FIG. 3, various reports and analytics related to parking lot usage by customers visiting the businesses affiliated with the parking lot can be generated using data collected by the parking lot use monitoring system 100.

In some implementations, the parking lot use monitoring system 100 is integrated with other monitoring systems and/or business intelligence systems. When a customer 126 is determined to enter a business 112, information related to the customer 126 and the generated vehicle recognition model 130 (e.g., including parking, customer information)

associated with the customer 126 can be transmitted (e.g., over the network 106) to one or more other monitoring systems and/or business intelligence systems. In one example, an interior monitoring system for the business 112 which the customer 126 has entered can integrate the information from the vehicle detection model 130 (e.g., to assist with automatic parking validation when the customer leaves the business). In another example, the interior monitoring system for the business 112 which the customer 126 has entered can alert the business that a customer has arrived for a pickup (e.g., food pickup, dry-cleaning pickup).

Figure 5:
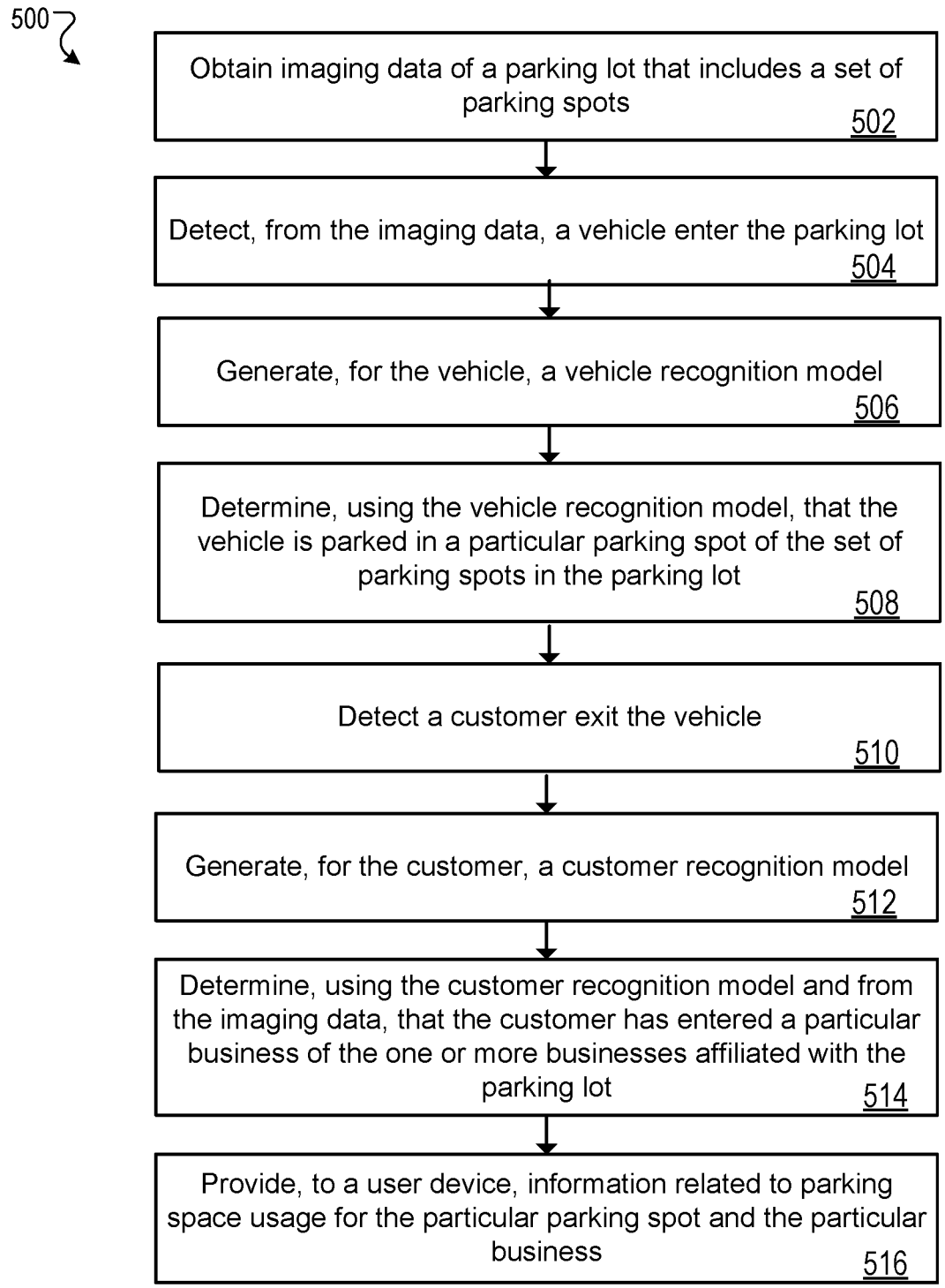
FIG. 5 is a flow diagram of another example process for parking lot use monitoring.

FIG. 5 is a flow diagram of another example process 500 for parking lot use monitoring. Imaging data 115 is obtained of a parking lot 104 that includes a set of parking spots 110 (502). Imaging data 115 is collected from distributed camera system 102 including one or more cameras. In some implementations, the one or more cameras of the distributed camera system 102 each has a field of view including a relevant area of the parking lot 104 and each camera has an overlapping field of view with at least a field of view of one other camera.

In some implementations, the one or more cameras of the distributed camera system 102 can have gaps in coverage of the parking lot 104 where the fields of view of the cameras do not cover the entire relevant area of the parking lot 104. For example, adjacent cameras can have a 2 foot gap in between respective fields of view of the adjacent cameras, such that an area of the parking lot 104 is outside the fields of view of the adjacent cameras.

In some implementations, a map for the parking lot can be generated from the imaging data 115 and one or more parking spots 110 in the parking lot 104 can be designated, for example, by a user on a user device 116. Designating parking spots 110 can include designating parking spot permissions, for example, designating which customers of particular businesses can use the particular parking spots. For example, a parking lot 104 shared between two businesses, Business A and Business B, can have half of the parking spots 110 designated as parking spots 110 for customers 126 of Business A, and half of the parking spots designated as parking spots 110 for customers 126 of Business B.

A vehicle 122 is detected entering the parking lot 104 from the imaging data (504). Imaging data 115 collected from a camera of the distributed camera system 102 having a field of view of an entrance to the parking lot 104 can detect the vehicle 122 entering the parking lot. Image processing software on the camera, at the server 108, or a combination thereof, can detect an object (e.g., the vehicle 122) in the imaging data from the camera.

A vehicle recognition model 130 is generated for the vehicle 122 (506). Vehicle recognition model can include, a digital (e.g., three-dimensional) representation of the vehicle 122 including vehicle appearance, geometry, and movement. Additionally, the vehicle recognition model 130 can include vehicle make, model, year, color, and other relevant physical feature aspects. Movement of the vehicle, for example, an expected direction of movement and a relative velocity can be included in the vehicle recognition model 130.

Using the vehicle recognition model 130, the vehicle 122 is determined to be parked in a particular parking spot 110a of the set of parking spots 110 in the parking lot 104 (508). The vehicle 122 can be determined to be parked in a particular parking spot 110a based in part on imaging data 115 collected from the distributed camera system 102, where the vehicle 122 is detected to be stationary in a parking spot 110a that is within a field of view of at least one camera of the distributed camera system 102.

In some implementations, determining that the vehicle 122 is parked in a particular parking spot 110a of the set of parking spots 110 in the parking lot 104 includes tracking, using imaging data 115 collected from one or more cameras of the distributed camera system 102 and the vehicle recognition model 130, a path 124 taken by the vehicle 122 through the parking lot 104 to the particular parking spot 110a.

A customer 126 is detected exiting the vehicle 122 (510). Imaging data 115 collected from a camera of the distributed camera system 102 having a field of view of the parking spot 110A can detect the customer 126 exiting the vehicle 122. Image processing software on the camera, at the server 108, or a combination thereof, can detect an object (e.g., the customer 126) in the imaging data from the camera. For example, image processing software including one or more classifiers can determine a bounding box including a head point and a foot point for the customer 126 and identify the customer 126 as a human object.

A customer recognition model is generated for the customer (512). A customer recognition model 131 can include, a digital (e.g., three-dimensional) representation of the customer 126 including facial recognition features, appearance, height/weight, and movement. Additionally, the customer recognition model 131 can include hair color, clothing, objects carried by the customer (e.g., purse or backpack), other relevant physical feature aspects. Movement of the customer, for example, an expected direction of movement and a relative velocity can be included in the customer recognition model 131.

Using the customer recognition model 131 and from the imaging data 115, the customer 126 is determined to enter a particular business 112 of the one or more businesses affiliated with the parking lot (514). The customer 126 can be determined to enter a particular business 112 based in part on imaging data 115 collected from the distributed camera system 102, where the customer 126 is detected to be entering a doorway of a business 112 that is within a field of view of at least one camera of the distributed camera system 102. In some implementations, cameras can be located on the inside of a business 112 and can record imaging data 115 including images depicting the customer 126 on the inside of the business 112.

In some implementations, determining that the customer 126 has entered a particular business of the one or more businesses affiliated with the parking lot 104 includes tracking, using imaging data 115 collected from the one or more cameras and the customer recognition model 131, a path 128 taken by the customer 126 from the vehicle 122 to the particular business 112.

Information is provided to a user device 116 related to parking space usage for the particular parking spot 110a and the particular business 112 (516). In some implementations, providing information related to parking space usage includes providing one or more parking usage reports in an application environment 120 on a user device 116. Further details related to parking usage reports are described with reference to FIG. 3 herein.

In some implementations, a designated business for the particular parking spot where the vehicle is parked does not match the particular business that the customer has entered. An alert can be generated including information related to the particular parking spot, where the alert is provided to a user, for example, to an owner of the designated business.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    obtaining imaging data of a parking lot that includes a set of parking spots, the parking lot affiliated with one or more businesses;
    detecting, from the imaging data, a vehicle enter the parking lot;
    generating, for the vehicle, a vehicle recognition model;
    determining, using the vehicle recognition model, that the vehicle is parked in a particular parking spot of the set of parking spots in the parking lot;
    detecting a customer exit the vehicle;
    generating, for the customer, a customer recognition model;
    determining, using the customer recognition model and from the imaging data, that the customer has entered a particular business of the one or more businesses affiliated with the parking lot; and
    providing, to a user device, information related to parking space usage for the particular parking spot and the particular business.

2. The method of claim 1, further comprising:
    determining, one or more designated businesses for the particular parking spot where the vehicle is parked;
    determining that the one or more designated businesses for the particular spot do not match the particular business that the customer has entered;
    generating an alert including information related to the particular parking spot; and
    providing the alert to a respective owner of each of the one or more designated businesses.

3. The method of claim 1, wherein providing information related to parking space usage includes providing, to the user device, one or more parking usage reports in an application environment.

4. The method of claim 1, further comprising:
    generating a map for the parking lot from the imaging data; and
    designating, by a user on the user device, parking spots in the parking lot.

5. The method of claim 4, wherein designating parking spots includes designating parking spot permissions.

6. The method of claim 1, wherein determining, using the vehicle recognition model, that the vehicle is parked in a particular parking spot of the set of parking spots in the parking lot comprises tracking, using imaging data collected from one or more cameras and the vehicle recognition model, a first path taken by the vehicle through the parking lot to the particular parking spot.

7. The method of claim 6, wherein determining, using the customer recognition model and from the imaging data, that the customer has entered a particular business of the one or more businesses affiliated with the parking lot comprises tracking, using imaging data collected from the one or more cameras and the customer recognition model, a second path taken by the customer from the vehicle to the particular business.

8. The method of claim 7, wherein the one or more cameras each has a field of view including a relevant area of the parking lot and each camera has an overlapping field of view with at least a field of view of one other camera.

9. A system, comprising:
    a data processing apparatus; and
    a non-transitory computer readable medium storing instructions executable by the data processing apparatus and thus upon such execution cause the data processing apparatus to perform operations comprising:
        obtaining imaging data of a parking lot that includes a set of parking spots, the parking lot affiliated with one or more businesses;
        detecting, from the imaging data, a vehicle enter the parking lot;
    generating, for the vehicle, a vehicle recognition model;
        determining, using the vehicle recognition model, that the vehicle is parked in a particular parking spot of the set of parking spots in the parking lot;
        detecting a customer exit the vehicle;
        generating, for the customer, a customer recognition model;
        determining, using the customer recognition model and from the imaging data, that the customer has entered a particular business of the one or more businesses affiliated with the parking lot; and
        providing, to a user device, information related to parking space usage for the particular parking spot and the particular business.

10. The system of claim 9, further comprising:
    determining, one or more designated businesses for the particular parking spot where the vehicle is parked;

determining that the one or more designated businesses for the particular spot do not match the particular business that the customer has entered;
generating an alert including information related to the particular parking spot; and
providing the alert to a respective owner of each of the designated businesses.

11. The system of claim 9, wherein providing information related to parking space usage includes providing, to the user device, one or more parking usage reports in an application environment.

12. The system of claim 9, further comprising:
generating a map for the parking lot from the imaging data; and
designating, by a user on the user device, parking spots in the parking lot.

13. The system of claim 12, wherein designating parking spots includes designating parking spot permissions.

14. The system of claim 9, wherein determining, using the vehicle recognition model, that the vehicle is parked in a particular parking spot of the set of parking spots in the parking lot comprises tracking, using imaging data collected from one or more cameras and the vehicle recognition model, a first path taken by the vehicle through the parking lot to the particular parking spot.

15. The system of claim 14, wherein determining, using the customer recognition model and from the imaging data, that the customer has entered a particular business of the one or more businesses affiliated with the parking lot comprises tracking, using imaging data collected from the one or more cameras and the customer recognition model, a second path taken by the customer from the vehicle to the particular business.

16. The system of claim 15, wherein the one or more cameras each has a field of view including a relevant area of the parking lot and each camera has an overlapping field of view with at least a field of view of one other camera.

17. At least one non-transitory computer-readable storage medium having stored thereon instructions which, when executed by at least one processor, cause performance of operations comprising:

obtaining imaging data of a parking lot that includes a set of parking spots, the parking lot affiliated with one or more businesses;
detecting, from the imaging data, a vehicle enter the parking lot;
generating, for the vehicle, a vehicle recognition model;
determining, using the vehicle recognition model, that the vehicle is parked in a particular parking spot of the set of parking spots in the parking lot;
detecting a customer exit the vehicle;
generating, for the customer, a customer recognition model;
determining, using the customer recognition model and from the imaging data, that the customer has entered a particular business of the one or more businesses affiliated with the parking lot; and
providing, to a user device, information related to parking space usage for the particular parking spot and the particular business.

18. The storage medium of claim 17, further comprising:
determining, one or more designated businesses for the particular parking spot where the vehicle is parked;
determining that the one or more designated businesses for the particular spot do not match the particular business that the customer has entered;
generating an alert including information related to the particular parking spot; and
providing the alert to a respective owner of each of the designated businesses.

19. The storage medium of claim 17, wherein providing information related to parking space usage includes providing, to the user device, one or more parking usage reports in an application environment.

20. The storage medium of claim 17, further comprising:
generating a map for the parking lot from the imaging data; and
designating, by a user on the user device, parking spots in the parking lot, including designating parking spot permissions.

* * * * *